(No Model.) 6 Sheets—Sheet 1.
T. G. & H. DAW.
MACHINE FOR PRODUCING STEREOTYPE MATRICES AND TYPE WRITING.
No. 531,586. Patented Dec. 25, 1894.
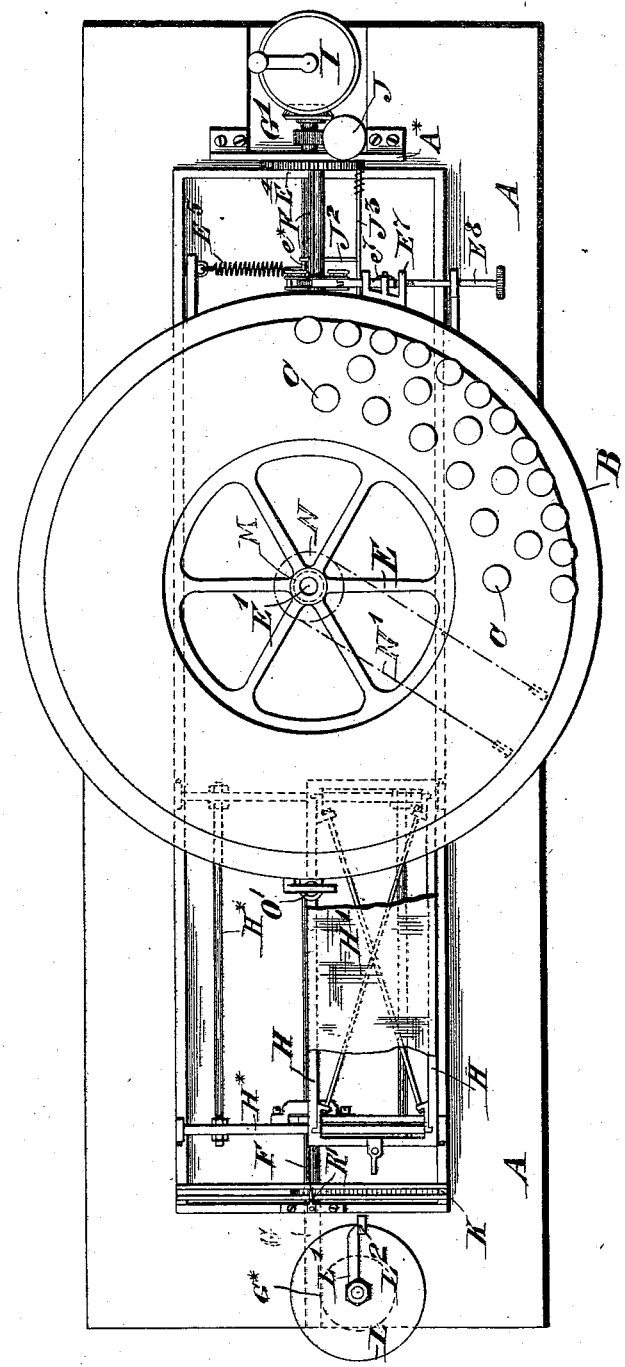

(No Model.) 6 Sheets—Sheet 2.
T. G. & H. DAW.
MACHINE FOR PRODUCING STEREOTYPE MATRICES AND TYPE WRITING.
No. 531,586. Patented Dec. 25, 1894.
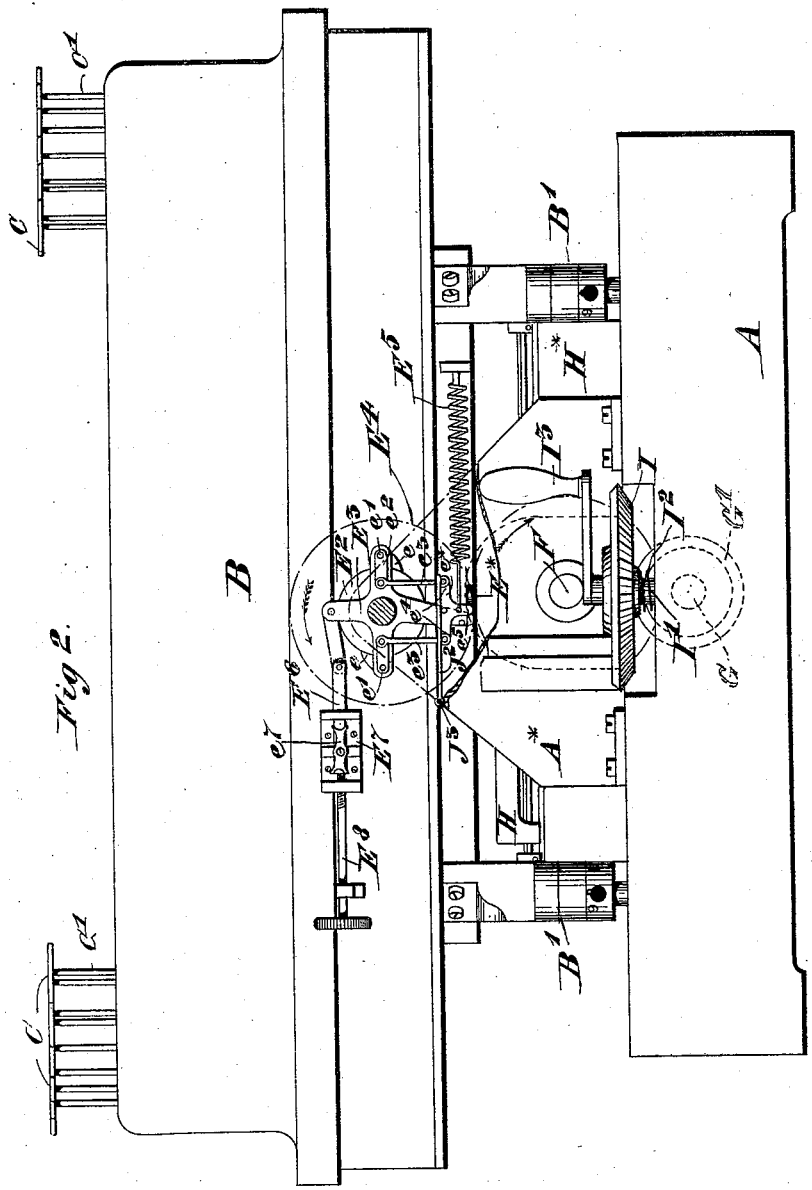

(No Model.) 6 Sheets—Sheet 3.
T. G. & H. DAW.
MACHINE FOR PRODUCING STEREOTYPE MATRICES AND TYPE WRITING.
No. 531,586. Patented Dec. 25, 1894.
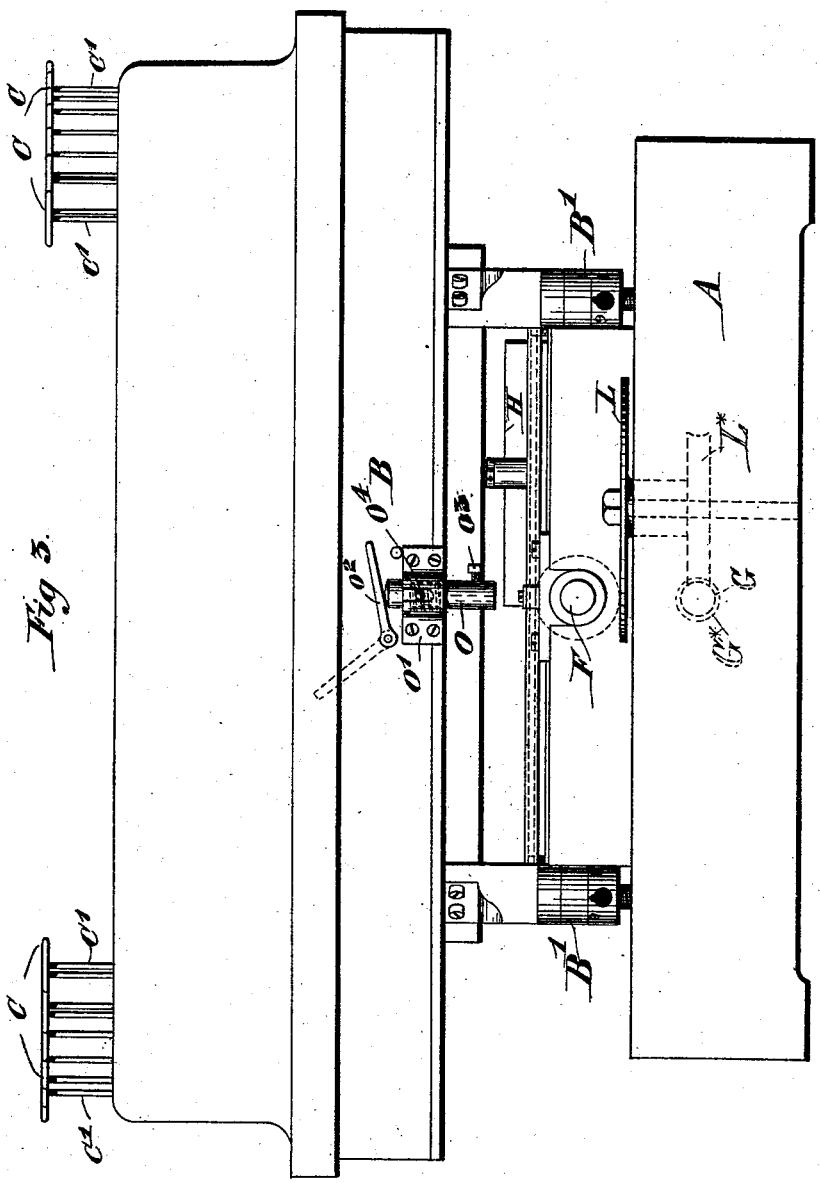

(No Model.) 6 Sheets—Sheet 4.
T. G. & H. DAW.
MACHINE FOR PRODUCING STEREOTYPE MATRICES AND TYPE WRITING.
No. 531,586. Patented Dec. 25, 1894.
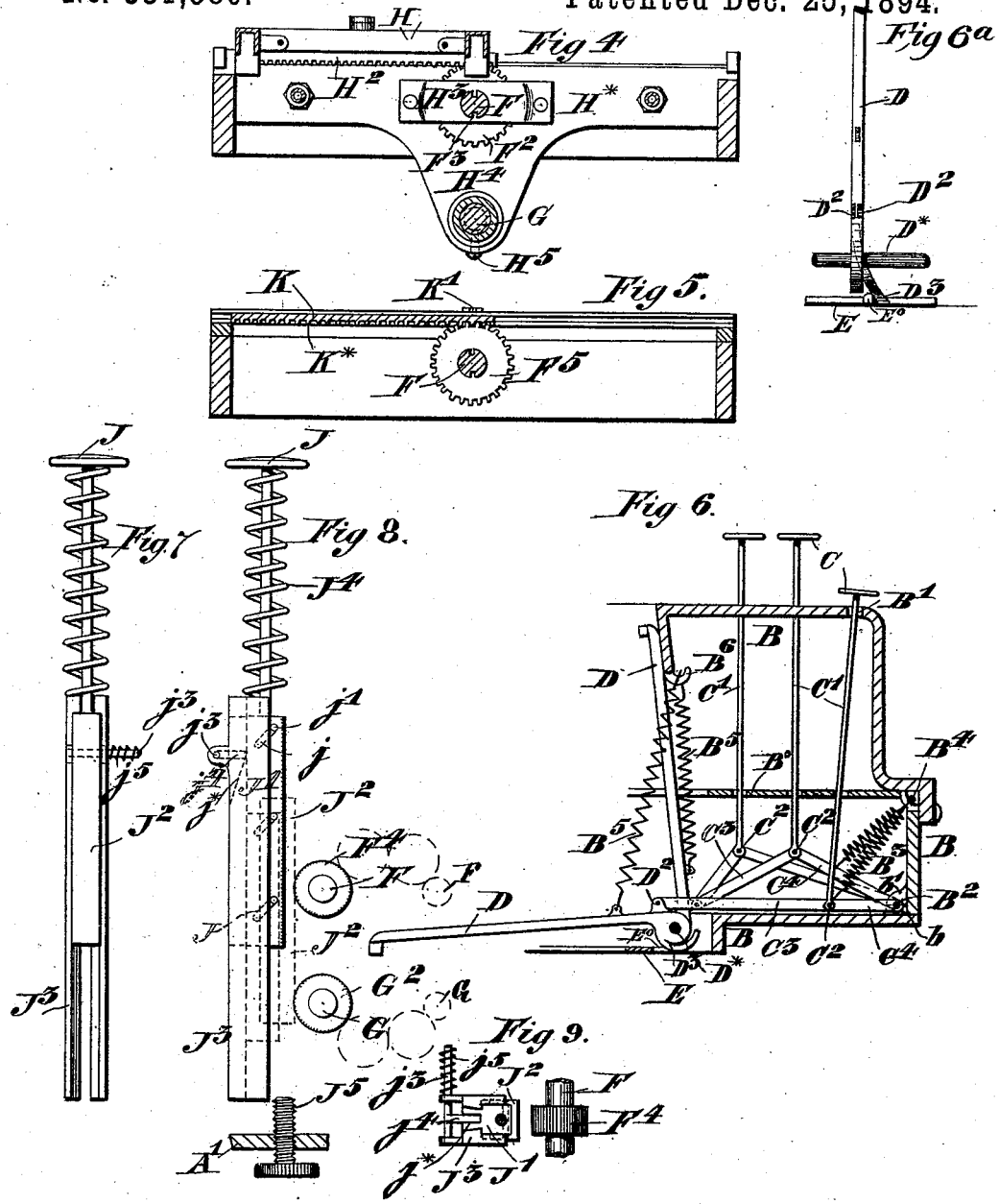

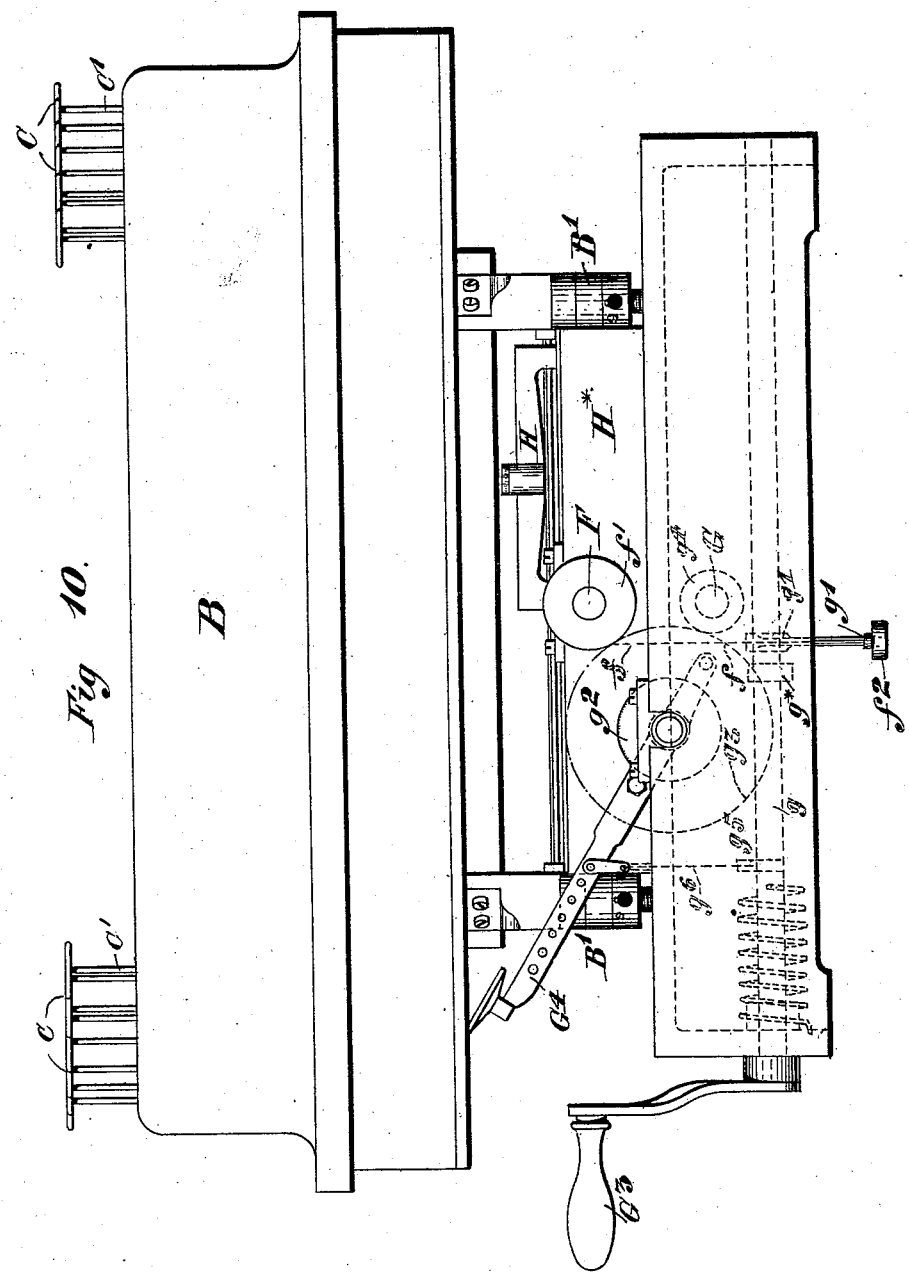

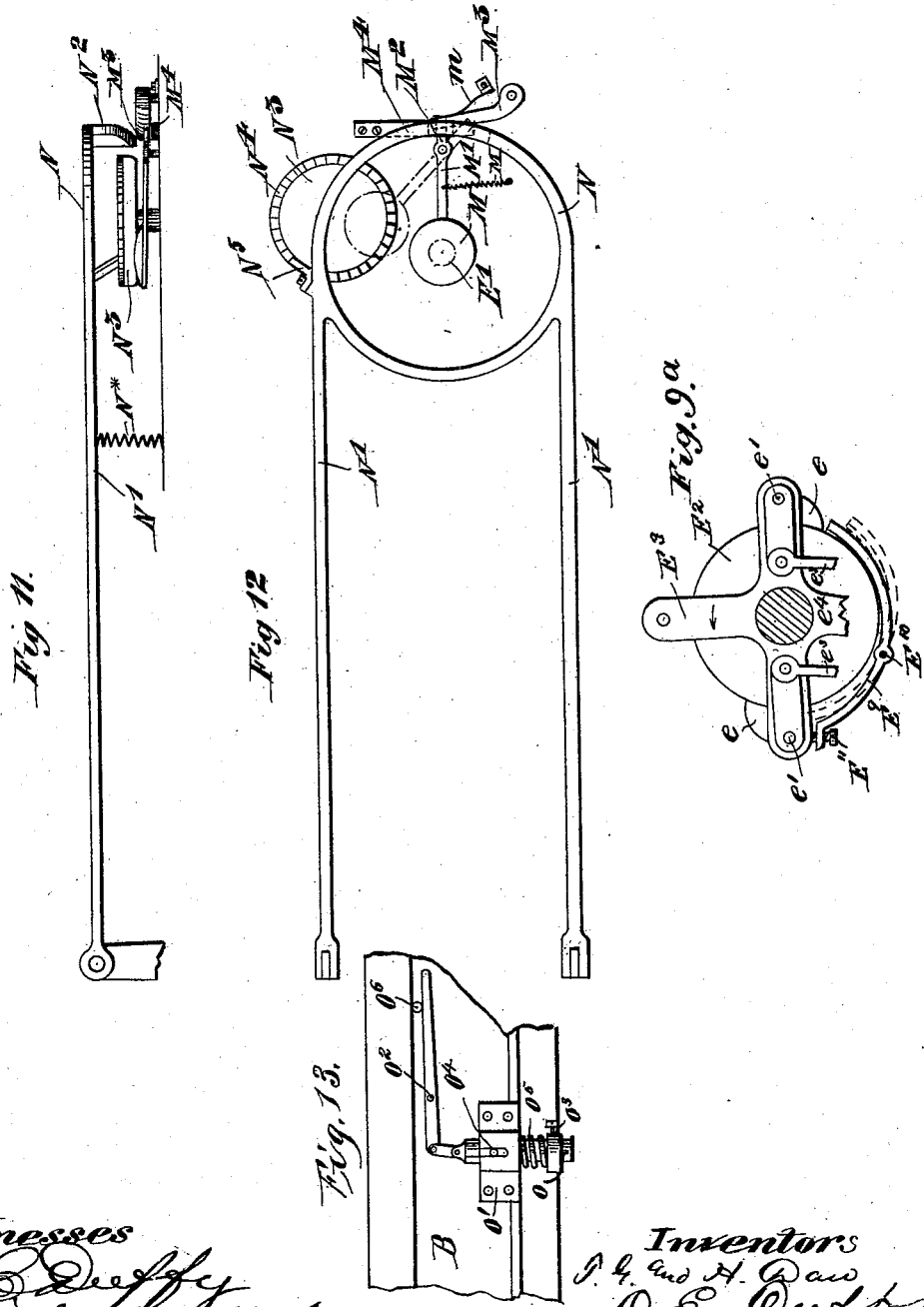

UNITED STATES PATENT OFFICE.

THOMAS GEORGE DAW AND HILDER DAW, OF SEVENOAKS, ENGLAND.

MACHINE FOR PRODUCING STEREOTYPE-MATRICES AND TYPE-WRITING.

SPECIFICATION forming part of Letters Patent No. 531,586, dated December 25, 1894.

Application filed January 21, 1892. Serial No. 418,746. (No model.) Patented in England September 17, 1891, No. 15,799; in Germany January 14, 1892, No. 71,383; in Victoria February 11, 1892, No. 9,454; in New South Wales February 13, 1892, No. 3,591; in Queensland February 15, 1892, No. 1,993; in Tasmania February 20, 1892, No. 103; in New Zealand February 25, 1892, No. 5,446; in France March 16, 1892, No. 220,192; in Belgium March 17, 1892, No. 98,841; in Sweden April 8, 1892, No. 5,053; in Norway April 8, 1892, No. 2,834; in Spain May 6, 1892, No. 13,149; in Italy June 30, 1892, No. 481; in Austria-Hungary July 7, 1892, No. 3,103, and in South Australia July 27, 1892, No. 2,275.

*To all whom it may concern:*

Be it known that we, THOMAS GEORGE DAW and HILDER DAW, subjects of the Queen of Great Britain and Ireland, residing at Sevenoaks, in the county of Kent, England, have invented Improvements in Machines for Producing Stereotype-Matrices and Type-Writing, (for which we have obtained Letters Patent in Great Britain, No. 15,799, dated September 17, 1891; in Germany, No. 71,383, dated January 14, 1892; in Austria-Hungary, No. 3,103, dated July 7, 1892; in Victoria, No. 9,454, dated February 11, 1892; in New South Wales, No. 3,591, dated February 13, 1892; in Queensland, No. 1,993, dated February 15, 1892; in South Australia, No. 2,275, dated July 27, 1892; in New Zealand, No. 5,446, dated February 25, 1892; in Tasmania, No. 103, dated February 20, 1892; in France, No. 220,192, dated March 16, 1892; in Belgium, No. 98,841, dated March 17, 1892; in Sweden, No. 5,053, dated April 8, 1892; in Norway, No. 2,834, dated April 8, 1892; in Spain, No. 13,149, dated May 6, 1892, and in Italy, No. 481, dated June 30, 1892,) of which the following is a specification.

This invention relates to improvements in machines for producing stereotype matrices and typewriting.

Machines constructed according to this invention are provided with improved means for actuating the type bars; for imparting motion to the carrier supporting the paper or material on which characters are to be impressed; for varying the depth of the impressions produced in the matrix material; and for indicating the position of the characters as they are impressed both as to the line they are in and as to their position in the line. Improved means are also provided for varying the space between the lines and between the characters, and for returning the paper or matrix material quickly to the position for starting a fresh line or page as may be required.

In the accompanying drawings:—Figure 1 is a plan of a machine constructed according to this invention. Fig. 2 is an enlarged right hand end elevation thereof partly in section, and Fig. 3 is an enlarged left hand end view. Figs. 4, 5, 6, 6$^a$, 7, 8, 9, and 9$^a$ are detail views to a larger scale. Fig. 10 is an end elevation showing a modified arrangement. Figs. 11 and 12 are respectively a side view and plan of an inking arrangement to a larger scale. Fig. 13 is a detail view showing a modification.

A is the bed of the machine carrying a head B formed in three parts or sections, Fig. 6, and in which are mounted type operating keys C, levers or bars D carrying the type, and an oscillating wheel E for actuating the spacing mechanism.

F and G are longitudinal rotary shafts, the latter being formed with a screw of coarse pitch.

H is a carrier for a plate H' to support the paper or material. This carrier derives from the shaft F, a transverse or sidewise motion, and from the screw threaded shaft G, a longitudinal motion.

I is a bevel wheel by which the shaft G can be rotated quickly when desired.

J is a key for actuating mechanism for bringing the carrier H to the starting position for a fresh line after one line has been completed.

K is a graduated scale for showing what part of the line is in the printing position.

L is a graduated scale or dial for showing which line is being printed, and for facilitating the return of the carrier H to the printing position after it has been withdrawn for examination or correction of the work.

M is an inking pad surrounded by a ring N which ring is struck by the type bars when the type strike the pad and serves to move the said pad out of the way of the type.

O is a special socket for receiving double line or special characters when such are to be printed, and for receiving ruling wheels when lines are to be ruled.

The keys C are each secured to a push rod C' that passes through a hole B' in the head B as shown more clearly in Fig. 6 and through a slot in an annular guide plate B$^0$. Each rod C' is connected at its lower end to the knee or joint C² of a pair of toggle bars C³, C⁴, there being one key and one pair of toggles for each character.

The keys are preferably arranged in three concentric series or circles, and the toggle bars to which the respective rods C' are connected, are made of such length that when the keys are in their raised positions the rods C' are vertical or practically so.

The type bars D which are arranged in a circle round the inner part of the head B, are each pivoted at one end to a ring or segmental piece of wire D*, the type or character being carried on the other or free end. A projection D² is formed on each type bar to which one end of the corresponding toggle bar C³ is connected. The toggle bars C⁴ are pivoted upon a ring or segmental piece of wire B² held in a groove formed between projections b b' on the lower and intermediate sections respectively of the head B as shown.

To operate the type bars, the key corresponding to the letter or character it is desired to impress, is depressed whereby the toggles connected to the rod C' thereof are forced into line, thus causing the end attached to the corresponding type bar to move outward, throwing the type bar into the nearly horizontal position shown in Fig. 6 and causing the type carried thereby to strike the paper or material.

The keys are raised after being operated by means of springs B³ connected at one end to a ring or segmental piece of wire B⁴ carried between the intermediate and upper sections of the head B, and at the other end to the corresponding toggle bar C⁴, there being one spring to each pair of toggles. In some cases these springs may be supplemented by springs B⁵ each attached at one end to a hook B⁶ on the upper section of the head B and at the other end directly to the type bar D near the projection D².

Each type bar D is provided near its pivot with a cam piece D³ bent out of the plane of the bar D and adapted to engage with a corresponding projection E⁰ on the upper face of the oscillating wheel E as shown to a larger scale in Fig. 6ᵃ. This wheel is supported round its periphery in the head B and has a central aperture E' through which the type on the ends of the bars D project when depressed for printing and which aperture serves to guide the type and keep them in truth. The cam pieces D³ serve by engaging with the said projections on the wheel E, to turn the said wheel slightly each time a type bar is operated as well understood.

For varying the depth of the impressions produced in the matrix material, the head B is carried on adjustable supports B' by which it can be raised or lowered relatively to the matrix carrier H. As the types always project the same distance through the aperture E', it will be evident that the depth of the impression will vary with the distance of the matrix material from the said aperture, which depends on the relative height of the head B or of the carrier H.

The spacing motion is effected through the medium of the oscillating wheel E and the shaft F as illustrated more clearly in Figs. 2 and 4. The oscillating movements of the said wheel are transmitted to the shaft through the medium of a roughened or serrated friction wheel E². The shaft or axle of this wheel is supported at one end in the head of the machine and at the other end in a support A*. The said wheel E² is acted on by a pair of pawls, clamps or grippers e carried in a four armed rocking frame E³, inclosing the wheel E², the said friction wheel having on its spindle a toothed wheel E⁴ gearing with a wheel F' on the shaft F. The frame E³ is caused to rock in one direction by a projection or finger E* on the oscillating wheel E, and is drawn back after this movement by a spring E⁵, the clamps or grippers e engaging the wheel E² in this backward movement and causing its partial rotation and thereby that of the shaft F. To cause the clamps or grippers e to engage the wheel E² at the proper time, they are mounted on short axles e' passing through the nearly horizontal arms of the rocking frame E³. These axles carry short arms e² connected by rods e³ with the corresponding pair of arms e⁴ of a three armed lever or piece e* pivoted to the lower vertical arm of the frame E³, and to the other arm e⁵ of which three armed lever or pivoted piece (hereinafter referred to as the pivoted piece) the spring E⁵ is connected. The projection E* above mentioned is also caused to act directly on the said arm e⁵. By the means described the initial movements of the projection E* caused by the oscillating wheel E, and the spring E⁵, are transmitted to the pivoted piece e*, so as to cause it to rock on its pivot before actuating the rocking frame E³, the projection E* moving the pivoted piece e* in such a direction as to lift the clamps or grippers e off the wheel E² before acting on the frame E³, while the action of the spring E⁵ first causes the pivoted piece to rock in the opposite direction to press the grippers e on the wheel E², and then moves the frame E³ backward so partially rotating the wheel E² and thereby the shaft F.

To regulate the spacing and also to render the movement of the frame E³ somewhat sluggish, the upper arm of the said frame is connected, as shown, to a sliding bar E⁶ adapted to move longitudinally with a certain amount of friction, due to the pressure on it of springs e⁷, in a bracket E⁷ secured to the head B. The movement of this bar to the left is limited by a screw stop E⁸ whereby the backward movement imparted to the frame E³ by the spring E⁵, and consequently the amount of rotation of the wheel E² and shaft F can be regulated as desired.

The carrier H is mounted to slide transversely on the end bars of a longitudinally movable frame $H^*$. Movement is transmitted from the shaft F to the carrier H by means of a toothed wheel $F^2$ on the said shaft engaging a rack $H^2$ on the under part of the carrier. The said wheel $F^2$ is free to slide longitudinally on the shaft F, but is rotatably connected therewith by feathers that take into longitudinal feather-ways $F^3$ in the said shaft. The said wheel is thus free to follow the longitudinal movements of the carrier frame $H^*$ which it is caused to do by a bracket $H^3$ thereon, between which bracket and the said frame, it is situated.

A brake of any known or suitable kind may be provided to overcome the momentum of the carrier. This brake may conveniently be caused to act on the wheel $E^2$ by the spacing mechanism during the return movement of the said mechanism, as indicated in elevation in the detail view Fig. $9^a$. In this arrangement $E^9$ is a lever pivoted at $E^{10}$ to the head of the machine, its lower arm being arranged to serve as a brake shoe to the wheel $E^2$ and its upper arm, which carries an adjustable screw $E^{11}$, being arranged to be acted upon by one of the horizontal arms of the frame $E^3$ to put on the brake, just before the said frame completes its turning movement in the direction of the arrow to feed the carrier.

The screw threaded shaft G passes through a projection $H^4$ on the carrier frame $H^*$, a set screw $H^5$ in the said projection engaging in the thread of the shaft, so that a longitudinal movement will be imparted to the carrier frame on the rotation of the shaft.

For the purpose of moving the carrier frame $H^*$ rapidly in a longitudinal direction, the shaft G is provided at one extremity with a bevel wheel $G'$ arranged to gear with the bevel wheel I above mentioned. This wheel I is mounted loosely on a short stud $I'$ and is acted on by a spring $I^2$ which normally keeps it out of engagement with the wheel $G'$. By depressing the wheel I however it can be readily put into gear with the said wheel $G'$ and at the same time can be rotated by a handle $I^3$ with which it is provided, thereby effecting a rapid rotation of the shaft G and a correspondingly rapid movement of the carrier frame $H^*$ and the carrier H.

To bring the carrier H to the position for commencing a fresh line after the completion of the preceding line, by the depression of the key J, the arrangement shown separately in side view in Fig. 7, in end view in Fig. 8 and in plan in Fig. 9 may be employed.

$J'$, $J^2$ are sliding pieces mounted in guides $J^3$, the piece $J^2$ being arranged to slide with a certain amount of friction so as to be somewhat sluggish in its action and being provided with inclined slots $j$ into which take pins $j'$ on the sliding piece $J'$, which latter is rigidly connected to the stem of the key J. When the said key is depressed, the pins $j'$ move downward in the slots $j$ owing to the sluggish action of the piece $J^2$, which piece is thus forced to the right (Fig. 8), and into position for engaging one or both of the wheels $F^4$, $G^2$, mounted respectively on the shafts F and G. In the continued downward movement of the key J, the piece $J^2$ is depressed as indicated in dotted lines and first rotates the wheel $F^4$ thus causing the shaft F through the wheel $F^2$ and rack $H^2$ (Fig. 4) to move the carrier H back to the beginning of a line. The piece $J^2$ also rotates the wheel $G^2$ and causes the screw threaded shaft G to move the carrier longitudinally into the position for the next line. The parts connected with the key J are raised, after being depressed, by a spiral spring $J^4$.

For regulating the space between the lines, a screw stop $J^5$ is provided to limit the downward movement of the sliding piece $J^2$.

In some instances the wheels $F^4$ $G^2$ instead of being mounted directly on their respective shafts, may be connected therewith by a train of change wheels.

Instead of employing the arrangement shown in Figs. 7, 8, and 9 the arrangement shown in Fig. 10, which is an end view of the machine with certain of the parts removed, can be employed. In this case a handle $G^3$ mounted on a shaft $g$ carries an arm $g'$ through a hole in the end of which passes a cord $f$ wound round a pulley $f'$ on the shaft F. As this shaft is rotated to move the carrier sidewise the cord $f$ is wound upon the pulley $f'$ till a button $f^2$ comes in contact with the arm $g'$. Then upon the handle $G^3$ being depressed, it causes the arm $g'$ to move downward, drawing the cord off the pulley $f'$, and rotating the shaft F so as to bring the carrier H to its starting position. With this arrangement the shaft G for imparting longitudinal movement to the carrier frame $H^*$ and carrier H, is actuated by a key or lever $G^4$ mounted on the shaft of the wheel $g^2$, on which shaft is also mounted a toothed wheel $g^3$ gearing with a pinion $g^4$ on the shaft G. The key $G^4$ carries a pawl or gripper which engages with the roughened surface of the wheel $g^2$ when the lever is moved downward but slides freely over it without engaging, when the lever moves upward, which it does when released, under the influence of a coiled spring surrounding the shaft on which it is mounted. The distance between the lines is regulated by adjusting the stroke of the lever $G^4$ by suitable stops. Means may be provided for lifting the pawl off the wheel $g^2$ when the lever is in its upper position.

The handle $G^3$ is preferably adapted to actuate the key $G^4$ through the medium of an arm $g^5$ on its shaft $g$ connected by a chain $g^6$ with the said key $G^4$. To prevent the grippers $e$ interfering with the movements of the carrier when the arrangement shown in Figs. 7, 8 and 9 is employed, an arm $j^2$ on a shaft $j^3$ (see Figs. 2, 7, 8 and 9) bears on one of the arms $e^4$ of the three armed piece $e^*$ another arm $j^4$ on the said shaft engaging in a recess $j^*$ in the sliding piece $J'$. The shaft $j^3$ is supported at one end in the head B and at the other end in the support A*. With this arrangement when the sliding piece J' with recess $j^*$ is depressed, the shaft $j^3$ will be permitted to turn sufficiently to cause the piece $j^2$ to act on the arm $e^4$ of the pivoted piece, and to rock the said piece on its pivot sufficiently to lift grippers $e$ out of action and prevent them interfering with the movement of the carrier H while the key J is being depressed. A spring $j^5$ on the shaft $j^3$ serves to turn the said shaft into its original position when the key is raised.

Where the arrangement shown in Fig. 10 is employed the parts $j^2$, $j^3$, $j^4$ and $j^5$ are retained, a cam $g^*$ on the shaft $g$ being employed to act on a vertical sliding piece not shown but which engages after the manner of the piece J' with the arm $g^4$.

To indicate the position of the character being printed relatively to the line it is in, the graduated scale K which is arranged to slide in suitable guides, is provided as shown in Fig. 5, with a rack K* on its under part. This rack corresponds with the rack $H^2$ (Fig. 4) of the carrier, and engages a toothed wheel $F^5$ corresponding with the toothed wheel $F^2$. By this means the movements of the scale K are made to correspond with the sidewise movements of the carrier H, so that when it is desired to justify the line, the amount of the line which has been completed can be readily ascertained by observing the position of the said scale relatively to an index or finger K'.

To indicate the line that is being printed, and to facilitate the return of the carrier to its proper position should it have been removed to permit inspection or correction of the work, the shaft G is geared by a worm G* with a worm wheel L* connected with the disk L. This disk L is mounted on a stationary spindle carrying a fixed pointer or finger L' which projects radially over the upper graduated face of the disk. $L^2$ is a clip carried on a radial arm beneath the said disk and arranged to grip the edge of the disk with a certain amount of friction. As the shaft G is rotated in moving the carrier H for the consecutive lines it causes the disk L to revolve, the clip $L^2$ being prevented from revolving therewith by coming in contact with the fixed finger or pointer L'. When however the shaft G is rotated in the opposite direction for the purpose of withdrawing the work, the clip $L^2$ moves with the disk L, which also turns in the opposite direction, and away from the fixed pointer L'. Thus when again returning the work to recommence impressing the characters, the proper position can be readily obtained by observing when the clip $L^2$ is again brought into contact with the pointer L'.

The toothed wheels $F^2$ $F^5$ for moving the carrier H and indicator scale K respectively, are preferably of the kind known in clock and watch manufacture as "maintaining wheels."

When a machine constructed according to this invention is employed for producing stereotype matrices, paper pulp or other suitable matrix material is placed on the plate $H^1$ of the carrier H so that by actuating the key C the type bars D cause the type to strike on the said matrix material and to impress therein their respective characters. After the material has been sufficiently impressed, it is removed from the carrier H and dried, preferably in a vacuum, after which castings in type metal for printing are taken from it in the usual manner.

When typewriting is to be produced, a sheet of paper is laid on the plate H' of the carrier and the characters are impressed as before by depressing the corresponding keys C, a suitable inking apparatus being provided to ink the type, or a sheet of carbon paper may be spread over or placed above the paper on the plate H'.

A suitable arrangement of inking apparatus is shown separately in Figs. 11 and 12, its position in the machine being shown in chain lines in Fig. 1. It comprises a pad M which is supported above the opening E' in the wheel E by a horizontal arm M' mounted loosely on a pivot $M^2$. This pivot $M^2$ is secured between the arms or spokes of the said wheel E to a stationary plate immediately below the same. A finger $M^3$ having rounded edges as more clearly shown in Fig. 11 is pressed sidewise by a spring $m$ and its lower edge by pressing on one end of the lever M' depresses that end and raises the pad slightly. A blade spring $M^4$ under the end of the lever $M^1$ gives to this lever a certain amount of resistance to the downward movement imparted by $M^3$ and tends to keep the lever M' horizontal. A ring N carried by arms N' has on its under side a wedge $N^2$ against which the upper part of the finger $M^3$ rests. This wedge acts on the same end of the lever M' as the spring finger $M^3$ and spring $M^4$. $N^3$ is a replenishing pad or disk from the under side of which the pad M receives its ink. This pad $N^3$ has on its upper side a circular rack $N^4$ with which a pawl $N^5$ on the ring N engages. The operation of this arrangement is as follows:—When a type bar D descends, its type strikes the pad, the bar at the same instant depressing the ring N whereby the finger $M^3$ is forced aside off the one end of the lever M' the other end of which is then slightly lowered by the action of the spring $M^4$ so as to move the pad M away from the depressed type. The further downward movement of the ring N then causes the wedge $N^2$ to swivel the lever and pad into the position shown in dotted lines underneath the edge of the replenishing pad $N^3$. After the wedge $N^2$ has ceased to move the lever sidewise, the ring N then bears thereon, depressing the end on which it bears and raising the pad M up against the replenishing pad $N^3$. A suitable spring M* is provided to return the lever to the position shown in full lines when the type bar rises, and springs N* beneath the arms N' are also provided to raise the ring N. The replenishing pad is rotated slowly with a step by step movement by the engagement of the pawl N⁵, at each downward movement of the ring N, with the circular rack N⁴ on the upper side of the said pad.

Each type may be formed by compressing a blank of phosphor bronze or other suitable metal in a mold having a movable adjustable bottom with an aperture corresponding in shape with the exterior outline of the character which the type is to print. The pressure forces a portion of the metal through the aperture. This is then cut away flush with the aperture and a die of suitable shape is moved up into the said aperture to form the inner indented portions of the type. By adjusting the movable bottom, the position of the type character can be adjusted relatively to the head or part of the type on which it is formed.

For printing double line and special characters and also for ruling lines, there is provided preferably at the left hand side of the machine the sliding socket or holder O as shown in Figs. 1 and 3. This cup is mounted in a bracket O' and is adapted to receive the special type. A lever or other similar device O² is provided by which the said socket O can be depressed to cause the type therein to impress its character on the matrix or paper. A suitable spring is also provided to raise the socket after it is depressed and a set screw O³ serves to keep the type in the socket. A pin O⁴ working in a slot in the bracket O' prevents O from turning, or the spring may be arranged to depress the socket and the lever to raise it in the manner indicated in Fig. 13 where the socket O is arranged to be depressed by the spring O⁵ and to be raised by the lever O² which is capable of being engaged with a pin O⁶ for the purpose of holding the socket in its raised position.

When lines are to be ruled, a small ruling wheel carried in a suitable stem may be mounted in the said socket so as to bear upon the material to be impressed, the line being ruled by moving the carrier H in the proper direction by imparting the necessary movements to the shaft F or G as the case may be in ruling transverse or longitudinal straight lines or to both shafts simultaneously for diagonal or curved lines.

What we claim is—

1. In a machine for producing stereotype matrices and typewriting, the combination with type operating mechanism, and a paper or matrix carrier, of a feeding wheel connected with said carrier and having a roughened serrated periphery, a feeding device adapted to act by friction against the periphery of said feeding wheel and to impart a step by step movement thereto and to said carrier feeding mechanism for actuating said device from said type operating mechanism, and a friction brake adapted to bear against the periphery of said feeding wheel and arranged to be actuated by said feeding mechanism during the return movement thereof, substantially as herein described for the purpose specified.

2. In a machine for producing stereotype matrices and typewriting, the combination, with the paper or matrix carrier H, of a frame H* on which the carrier slides transversely, a screw threaded shaft G engaging said frame, a longitudinal slotted shaft F, a toothed wheel F² on said slotted shaft, a rack H² on said carrier and with which said toothed wheel engages, wheels F⁴ and G² fixed on said shafts F and G respectively, a vertical slide J² adapted to engage frictionally in its downward movement with each of said wheels F⁴ and G², a key J for depressing said slide, and an adjustable stop J⁵ to limit the downward movement of said slide, substantially as described.

3. In a machine for producing stereotype matrices and typewriting, the combination with a paper or matrix carrier, of a wheel E² from which motion is transmitted to said carrier, a rocking frame E³ carrying grippers e to engage said wheel, a pivoted piece e* carried by said rocking frame and having arms connected with corresponding arms on the axles of the said grippers, and means for moving the said pivoted piece so as to put the grippers into or out of engagement with said wheel prior to the movement of said frame substantially as described.

4. In a machine for producing stereotype matrices and typewriting, the combination with a paper or matrix carrier, type bars and cams D² carried by said bars, of a wheel E² from which motion is transmitted to said carrier, a rocking frame E³ inclosing said wheel and carrying grippers e, a pivoted piece e* carried by said frame and serving to put said grippers e in and out of engagement with said wheel, an oscillating wheel E provided with projections E⁰ arranged to be acted upon by said cams D², and having a finger or projection E* engaging the said pivoted piece e, the spring E⁵, the sliding bar E⁶, and an adjustable stop E⁸ for said sliding bar, substantially as described for the purpose specified.

5. In a machine for producing stereotype matrices or typewriting, the combination with a transverse movable carrier, a toothed wheel F² and shaft F for moving the carrier transversely and feeding mechanism for imparting an intermittent rotary motion to said shaft, of a justification scale K, a toothed wheel F⁵ fixed on said shaft and arranged to move said justification scale transversely in a corresponding manner to said carrier, and a fixed pointer or index K' substantially as herein described for the purpose specified.

6. In a machine for producing stereotype matrices and typewriting, the combination with a carrier and a shaft for imparting longitudinal motion thereto to form successive lines, of indicating mechanism, comprising a graduated disk geared with said shaft and provided with a clip L² capable of sliding thereon, and a fixed pointer or finger L' arranged to prevent movement of said clip with the disk in one direction substantially as herein described for the purpose specified.

7. In a machine for producing stereotype matrices and typewriting, the combination of the carrier H, the carrier frame H*, a screw threaded shaft G for operating said frame, a beveled wheel G' on said shaft, a beveled toothed disk I adapted to be moved into and out of engagement with said wheel, and a spring I' by which the said beveled disk is normally held out of engagement with said beveled wheel substantially as described for the purpose specified.

8. In a machine for producing stereotype matrices and typewriting, the combination with the type bars D, of the inking pad M, the ring N, the replenishing pad N³, the lever M', the cam N² on the ring N, the finger M³, the springs M⁴, the circular rack N⁴ on the pad N³, and the pawl N⁵ substantially as described for the purpose specified.

9. In a machine for producing stereotype matrices and typewriting, the combination of a carrier H for the matrix material or paper to be impressed, a head B arranged above said carrier and carrying type and type operating mechanism, an oscillating wheel E adapted to be actuated from said type operating mechanism, and formed with a central aperture E' through which the type projects when depressed, and vertically adjustable supports B' whereon said head rests substantially as described for the purpose specified.

10. In a machine for producing stereotype matrices and typewriting, and provided with type and type operating mechanism, a supplementary socket or holder O for holding special characters, a guide in which said socket or holder can slide, and a lever for operating said socket or holder substantially as described.

In testimony whereof we have signed our names to this specification in the presence of two subscribing witnesses.

THOMAS GEORGE DAW.
HILDER DAW.

Witnesses:
EDMUND S. SNEWIN,
PERCY E. MATTOCKS,
*Both of 2 Pope's Head Alley, Cornhill, London, E. C.*